United States Patent
Chiu et al.

(10) Patent No.: US 7,449,849 B2
(45) Date of Patent: Nov. 11, 2008

(54) MOTOR CONTROL CIRCUIT AND METHOD THEREOF

(75) Inventors: Chun-Lung Chiu, Taoyuan Hsien (TW); Ming-Shi Tsai, Taoyuan Hsien (TW); Wen-Shi Huang, Taoyuan Hsien (TW)

(73) Assignee: Delta Electronics, Inc., Taoyuan Hsien (TW)

( * ) Notice: Subject to any disclaimer, the term of this patent is extended or adjusted under 35 U.S.C. 154(b) by 236 days.

(21) Appl. No.: 11/257,070

(22) Filed: Oct. 25, 2005

(65) Prior Publication Data

US 2006/0087264 A1      Apr. 27, 2006

(30) Foreign Application Priority Data

Oct. 26, 2004   (TW) .............................. 93132455 A (51) Int. Cl.
   *H02P 5/00*   (2006.01)
   *H02P 5/46*   (2006.01)
   *H02P 7/08*   (2006.01)

(52) U.S. Cl. ...................................................... 318/66

(58) Field of Classification Search .................... 318/66
   See application file for complete search history.

(56) References Cited

U.S. PATENT DOCUMENTS 4,804,892 A       2/1989   Muller
6,812,667 B2 *   11/2004   Yasohara et al. ............ 318/599

FOREIGN PATENT DOCUMENTS

| JP | S59-176395 | 11/1984 |
|---|---|---|
| JP | 07-322629 | 12/1995 |
| JP | 10-201280 | 7/1998 |
| JP | 2002-171784 | 6/2002 |

* cited by examiner

*Primary Examiner*—Lincoln Donovan
*Assistant Examiner*—Erick Glass
(74) *Attorney, Agent, or Firm*—Birch, Stewart, Kolasch & Birch, LLP (57) ABSTRACT

A motor control circuit and method thereof serving a coil for controlling the motor. The motor control circuit comprises a separated signal generating circuit generating a separated signal and a comparator comparing a first phase signal from a Hall element or a second phase signal from a phase signal generating circuit with the separated signal. Thus, a motor speed control signal is generated to control the motor. The noise is reduced during controlling the motor.

19 Claims, 7 Drawing Sheets

MOTOR CONTROL CIRCUIT AND METHOD THEREOF

BACKGROUND OF THE INVENTION

1. Field of the Invention

The invention relates to a motor control circuit, and more specifically to a motor control circuit with reduced noise and control method thereof.

2. Brief Discussion of the Related Art

Current motor controlling techniques had been a highly developmental technology. In the related art, circuits exist which not only control the start-up of motors but also change and limit the motor speed in addition to other functions.

Figure 1:
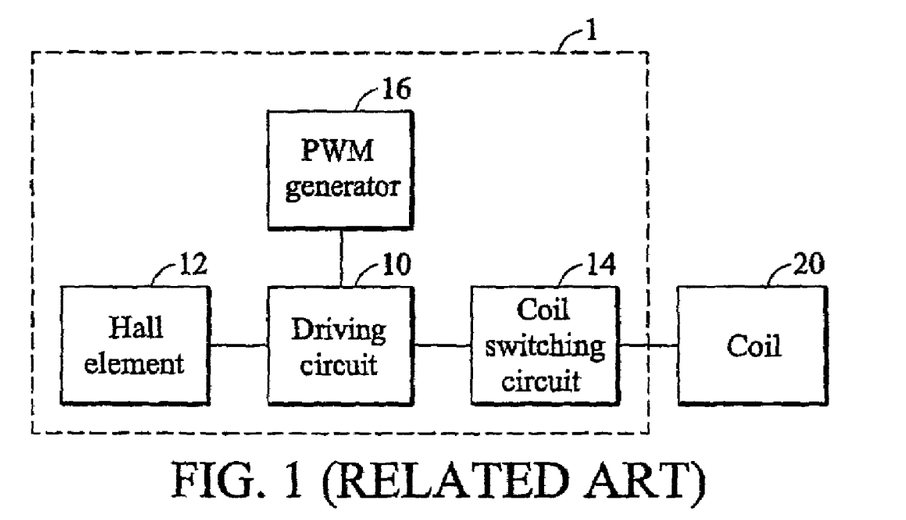
FIG. 1 is a block diagram of a conventional motor control circuit.
Figure 2:
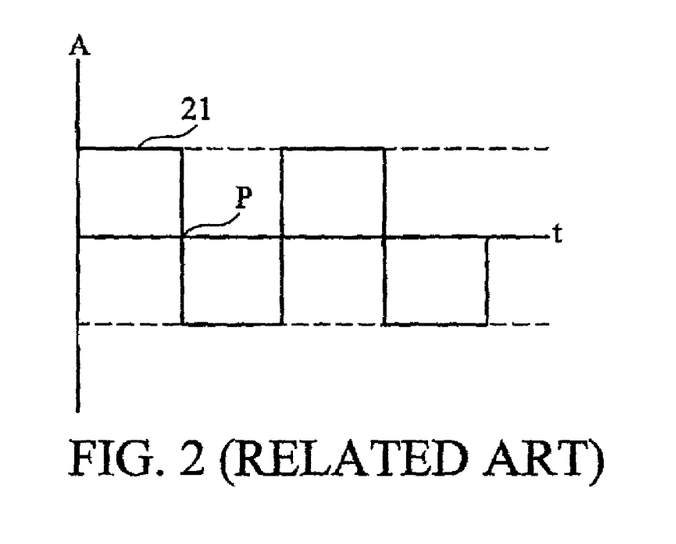
FIG. 2 is a pulse diagram of the motor speed control signal in a conventional motor control circuit.

For example, FIG. 1 shows a conventional motor control circuit. As depicted, the motor control circuit 1 comprises a driving circuit 10, a Hall element 12, a coil switching circuit 14 and a pulse width modulation generator 16. Hall element 12 detects signals generated by the motor (not shown in the figure), such as the phase switching signal generated during the rotation of the motor, and generates a phase signal wherein the phase thereof is consistent with the rotation phase of the motor. Driving circuit 10 is coupled to Hall element 12 and receives the phase signal from hall element 12 to generate a motor speed control signal which usually comprises a plurality of continuous and periodic square pulses. FIG. 2 shows a pulse diagram of motor speed control signal 21, wherein the y-axis A denotes the amplitude of signal 21 or voltage in this example and x-axis t denotes the time. Moreover, driving circuit 10 controls the motor to stop, limits the motor speed and even controls other functions. Driving circuit 10 is generally made up of an application specific integrated circuit (ASIC) which is familiar to get for the person skilled in the art. Coil switching circuit 14 usually comprises two MOS switches. When receiving the motor speed control signal from driving circuit 10, coil switching circuit 14 outputs the motor speed control signal to the coil 20 in the motor accordingly and thereby switches the current directions in two neighboring phases of the coil 20, maintaining rotation of the motor.

Figure 3:
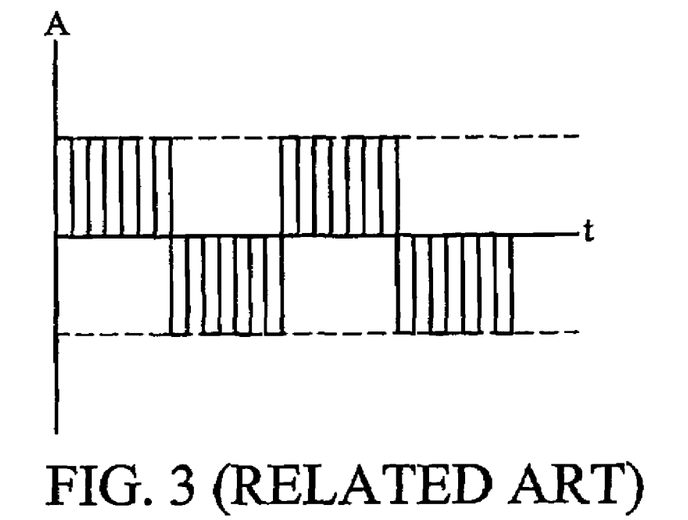
FIG. 3 is a pulse diagram of the motor speed control signal in a conventional motor control circuit with the pulse width modulation generator.
Figure 4:
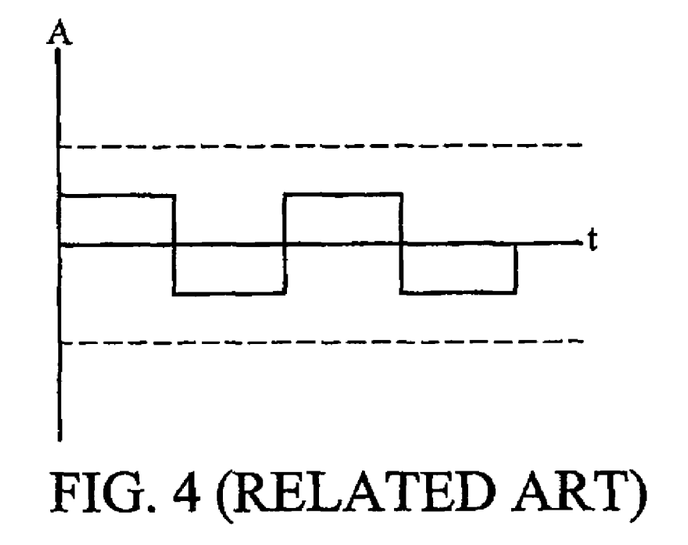
FIG. 4 is a pulse diagram of the equivalent motor speed control signal in a conventional motor control circuit with the pulse width modulation generator.

Further, a pulse width modulation (PWM) generator 16 is provided to modulate the motor speed control signal into a plurality of small periodic square pulses as shown in FIG. 3. According to the equivalence principle, the amplitude of the equivalent motor speed control signal is smaller than that of the original motor speed control signal as shown in FIG. 4 and thus the motor speed is decreased when the equivalent motor speed control signal is input to the coil 20 in the motor. The method of decreasing motor speed relates to modulating the square pulses in pulse width modulation but as this is a related art method, it is not described in further detail here.

When the phase of coil 20 in the motor is changed, that is, the current direction is changed as shown by point P in FIG. 2, a very loud noise typically occurs with such motor speed control signal, particularly when used as a fan motor. Thus, the usage of this type of fan motor is therefore limited.

SUMMARY OF THE INVENTION

The present invention is generally directed to a motor control circuit to generate a new motor speed control signal for controlling the motor speed, thus reducing the motor noise when the coil changes phase.

According to one aspect of the invention, the motor control circuit comprises a Hall element, a separated signal, a comparator and a coil switching circuit. The Hall element generates a first phase signal. The separated signal generating circuit generates a separated signal. The comparator is coupled to the Hall element and the separated signal generating circuit and compares the first phase signal and the separated signal to generate a first control signal. The coil switching circuit is coupled to the comparator and receives the first control signal to serve the coil, thus starting the motor.

The motor control circuit further comprises a phase signal generating circuit generating a first phase signal wherein the phase of the first phase signal is consistent with the rotation phase of the coil in the motor. The comparator is coupled to the phase signal generating circuit and the separated signal generating circuit, comparing the first phase signal and the separated signal to generate a first control signal.

Moreover, the separated signal comprises a plurality of continuous and periodic separated pulses, wherein the separated pulse is selected from the group consisting of triangular, sinusoidal, trapezoidal, and polygonal pulses.

The motor control circuit further comprises an amplifier circuit coupled between the Hall element and the comparator, receiving the first phase signal and amplifying the first phase signal to the comparator.

Further, the first control signal is a first motor speed control signal comprising a plurality of square pulses, wherein within a specified phase, the width of a square pulse near the center of the phase is greater than that of a square pulse farther from the center.

The motor control circuit further comprises a driving circuit coupled to the Hall element, receiving the second phase signal to generate a second control signal to the coil switching circuit, wherein the second control signal comprises a function control signal and a second motor speed control signal and the function control signal is selected from the group consisting of lock, test and restart signals.

The motor control circuit further comprises a pulse width modulation (PWM) generator coupled to the coil switching circuit to modulate the input signals of the coil switching circuit for changing the motor speed. Moreover, The motor is a fan motor.

Additionally, a motor control method controlling a coil in a motor and thus controlling the motor to rotate is disclosed. The motor control method comprises receiving a phase signal wherein the phase of the phase signal is consistent with the rotation phase of the coil in the motor. A separated signal is then generated. The phase signal and the separated signal are compared to generate a control signal. The coil in the motor is controlled, and thus the motor starts to rotate upon receiving the motor speed control signal through a coil switching circuit.

The separated signal comprises a plurality of continuous and periodic separated pulses, wherein the separated pulse is selected from the group consisting of triangular, sinusoidal, trapezoidal, and polygonal pulses. Further, the control signal is a motor speed control signal comprising a plurality of square pulses wherein within a specified phase, the width of a square pulse near the center of the phase is greater than that of a square pulse farther from the center.

The method further comprises supplying a pulse width modulating signal to the coil switching circuit wherein the pulse width modulating signal is the modulated version of the control signal for decreasing the motor speed. Moreover, the motor is a fan motor.

Further scope of the applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 5:
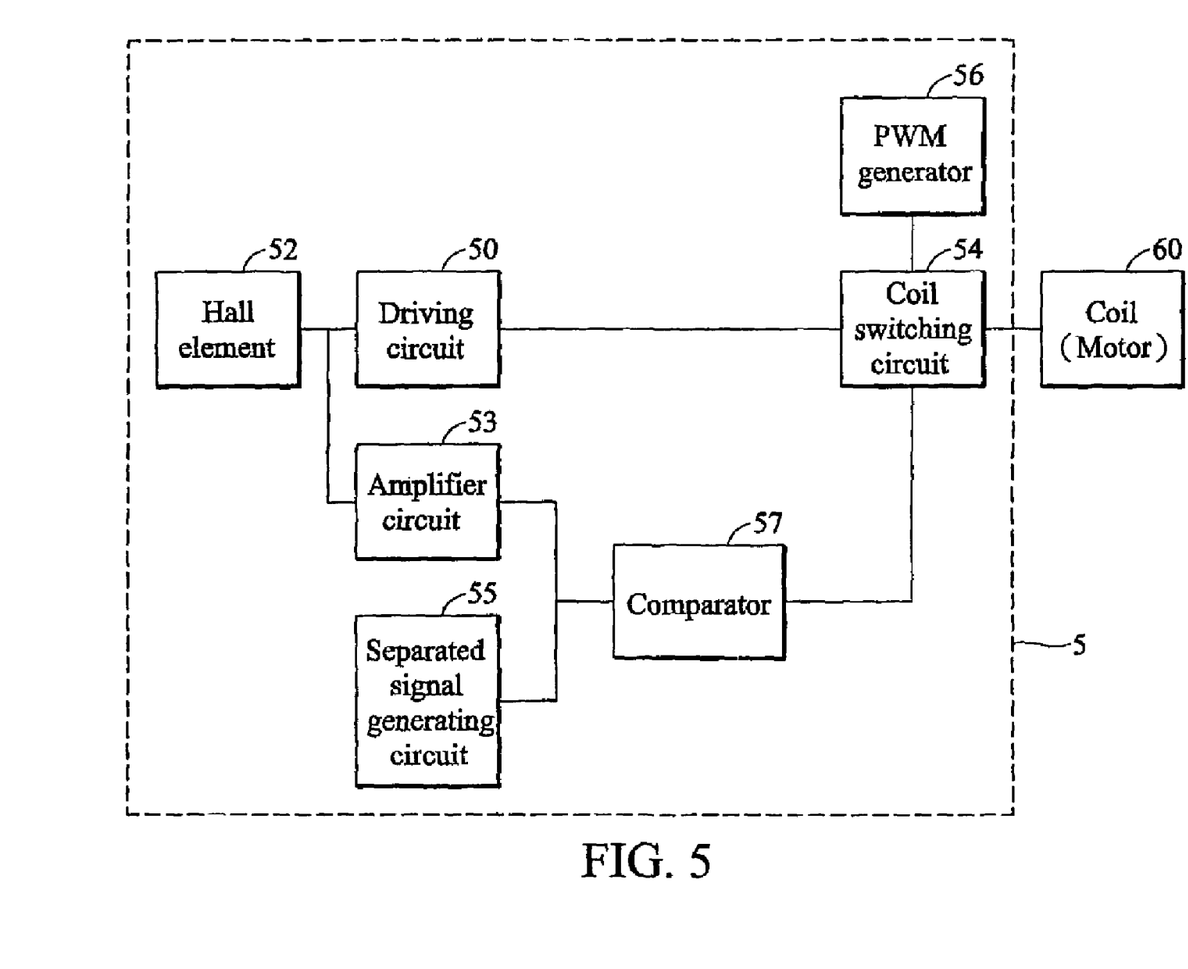
FIG. 5 is a block diagram illustrating the first embodiment of a motor control circuit.

FIG. 5 shows a motor control circuit 5 according to the first embodiment of the invention, comprising: a driving circuit 50; a Hall element 52; a coil switching circuit 54; a pulse width modulation generator 56; an amplifier circuit 53; a separated signal generating circuit 55 and a comparator 57; wherein the driving circuit 50, Hall element 52, and the coil switching circuit 54 perform the same operational characteristics as the driving circuit 10, Hall element 12 and coil switching circuit 14 shown in FIG. 1. The separated signal generating circuit 55 generates a separated signal. The amplifier circuit 53 is coupled to the Hall element 52 to receive a first phase signal and amplify the first phase signal to the comparator 57. The comparator 57 coupled to amplifier circuit 53 and separated signal generating circuit 55, compares the first phase signal and the separated signal to generate a first control signal to the coil switching circuit 54. The coil switching circuit 54 outputs the first control signal to the coil 60 in the motor (not shown in the figure) to drive the motor.

Figure 6:
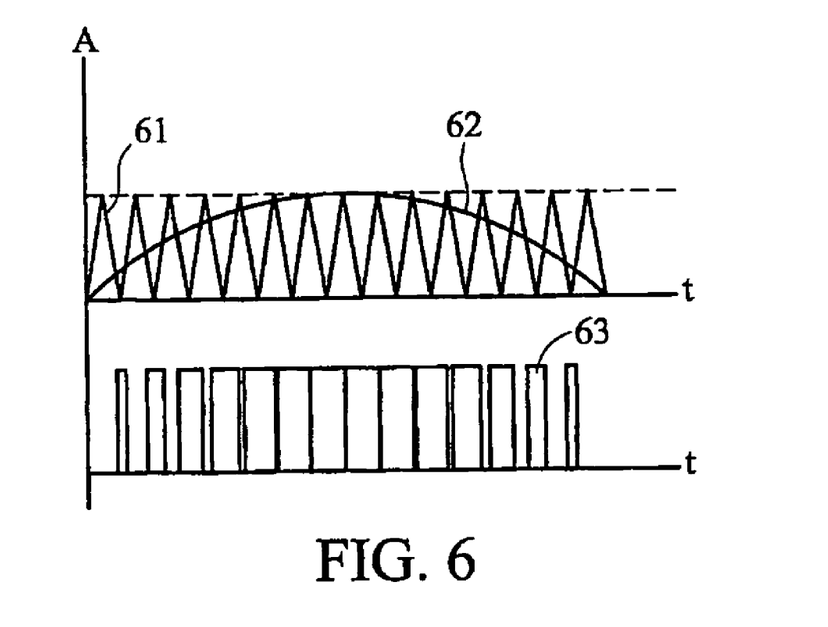
FIG. 6 is a pulse diagram illustrating the first motor speed control signal in the first embodiment of a motor control circuit.
Figure 8:
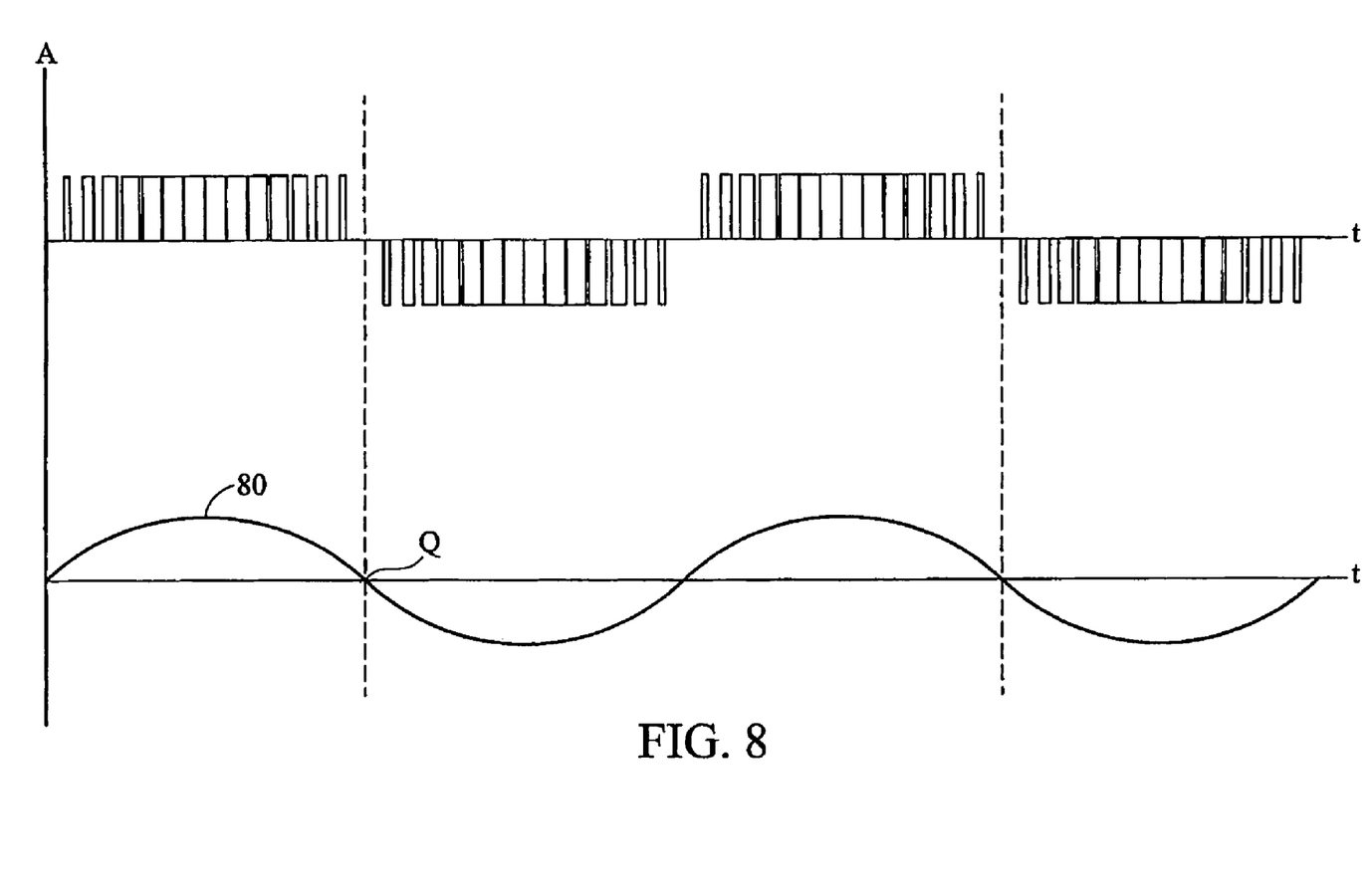
FIG. 8 is a pulse diagram illustrating the equivalent first motor speed control signal in the first embodiment of a motor control circuit.

The operation of the motor control circuit 5 is described in the following. The separated signal generated by the separated signal generating circuit 55 comprises a plurality of continuous and periodic separated pulses. Please refer to FIG. 6, which shows a pulse diagram of the separated signal 61 within a specified phase. FIG. 6 shows that the separated signal 61 comprises separated, continuous and periodic triangular pulses. Moreover, the amplifier circuit 53 amplifies the first phase signal from Hall element 52 and generates an amplified first phase signal 62 wherein the phase of the first phase signal 62 is consistent with the rotation phase of coil 60 in the motor. The comparator 57 compares the first separated signal 61 and the first phase signal 62 to generate a first control signal, that is the first motor speed control signal 63. The comparison principle is, for example, the comparator generates a high level signal when the amplitude of separated signal 61 is smaller than the first phase signal 62, otherwise, a low level signal. Thus the first motor speed control signal 63 is generated as shown in FIG. 6 and comprises a plurality of square pulses wherein within a specified phase, the width of a square pulse near the center of the phase is greater than that of a square pulse farther from the center of the phase as shown in FIG. 8. The first motor speed control signal 63 is equivalent to first motor speed control signal 80 and the noise caused by the coil 60 due to changing the current direction is reduced as shown by the point Q of equivalent signal 80 in FIG. 8, which shows a smooth change in direction.

As mentioned, with the amplifier circuit 53, separated signal generating circuit 55 and comparator 57, the motor control circuit 5 provides a first control signal (i.e. the first motor speed control signal) to the coil switching circuit 54 and reduces the rotational noise. The driving circuit 50, however, also provides a second control signal to the coil switching circuit 54 as conventional controlling circuit wherein the second control signal comprises a function control signal and a second motor speed control signal. The function control signal provides lock, test and restart signals to control the motor to stop, to limit the speed and even other functions. The second motor speed control signal is the conventional motor speed control signal shown in FIG. 2. The coil switching circuit 54 in this embodiment is capable of either receiving the first or second motor speed control signals to serve the coil as determined by the circuit design. For example, when designing a fan, the coil switching circuit 54 can choose to receive the first motor speed control signal to serve the coil, reducing noise if the motor is used in a quiet environment. Otherwise, the coil switching circuit 54 may choose to receive the second motor speed control signal to attain a better performance.

Figure 7:
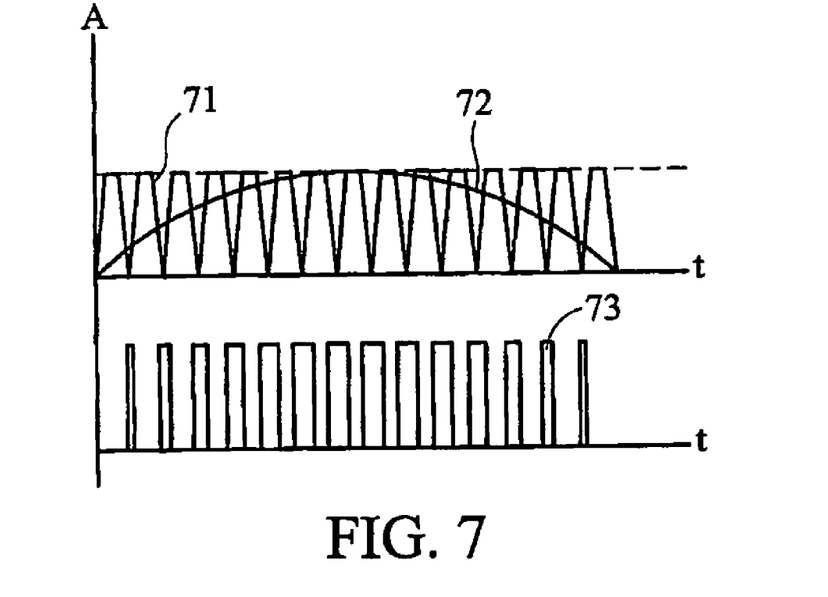
FIG. 7 is a pulse diagram illustrating another first motor speed control signal in the first embodiment of a motor control circuit.

Furthermore, the separated signal generated by the separated signal generating circuit 55 is not limited to comprise a plurality of periodic triangular pulses and can also comprise a plurality of periodic trapezoidal pulses. As shown in FIG. 7, the separated signal generating circuit 55 generates a separated signal 71 composed of a plurality of separated trapezoidal pulses. The separated signal 71 is then compared to the first phase signal 72 by the comparator 57 the same as mentioned above to generate a first motor speed control signal 73 wherein the width of a square pulse near the center of the phase is greater than that of a square pulse farther from the center of the phase, within a specified phase. Generally speaking, the first motor speed control signal 73 performs functions similar to the first motor speed control signal 63. The difference is in the width of the square pulses thereof. Similarly, the separated signal generated by the separated signal generating circuit 55 can also comprise other pulses, such as square, sinusoidal, and polygonal pulses to achieve similar performance.

The invention also controls the motor speed wherein the motor control circuit 5 further comprises a pulse width modulation generator 56 coupled to the coil switching circuit 54 for modulating the first or second motor speed control signals into a plurality of small square pulses, thus decreasing the motor speed.

Figure 9:
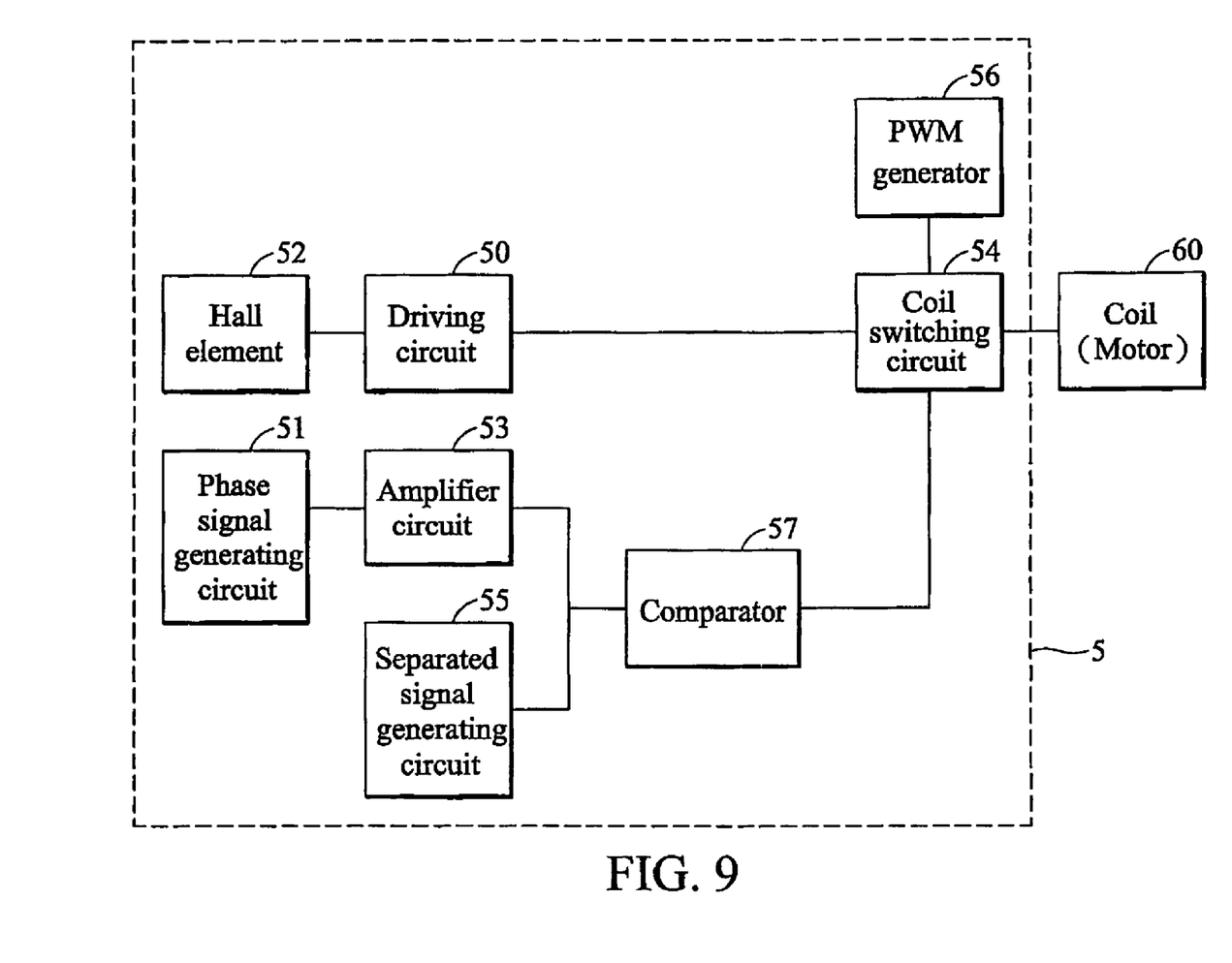
FIG. 9 is a block diagram illustrating the second embodiment of a motor control circuit.

FIG. 9 shows the second embodiment of the invention which is similar to the first embodiment except that the motor control circuit 5 therein further comprises a phase signal generating circuit 51 for generating a second phase signal having the same phase as the first phase signal generated by the Hall element 51, put simply, the rotation phase of the coil 60 in the motor. The second phase signal is amplified by the amplifier circuit 53 and the comparator 57 then compares the second phase signal to the separated signal generated by the separated signal generating circuit 55 to generate a first control signal to the coil switching circuit 54. The coil switching circuit then outputs the first control signal to the coil 60 in the motor (not shown in the figure) to control rotation of the motor.

Figure 10:
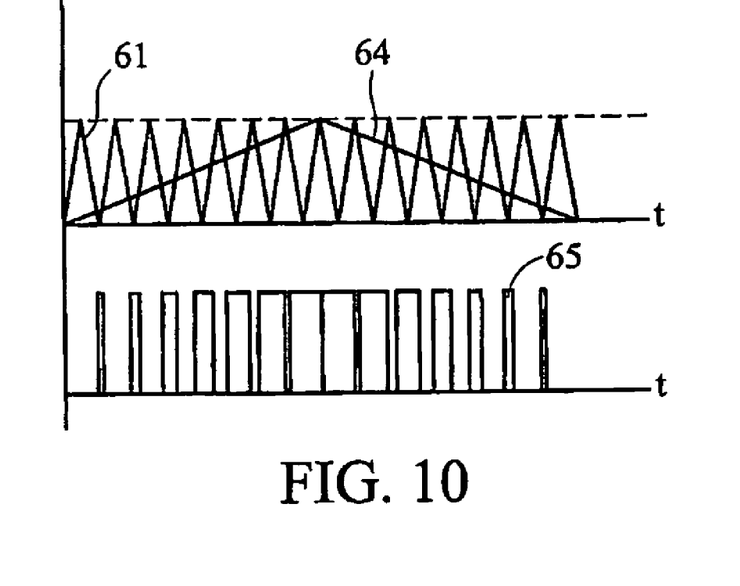
FIG. 10 is a pulse diagram illustrating the first motor speed control signal in the second embodiment of a motor control circuit.
Figure 11:
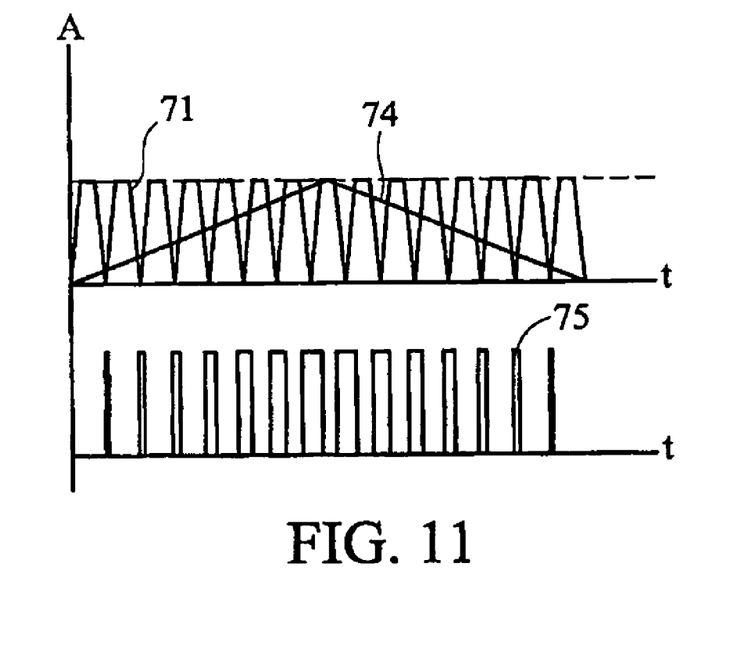
FIG. 11 is a pulse diagram illustrating another first motor speed control signal in the second embodiment of a motor control circuit.

The first control signal is the first motor speed control signal generated by the comparator 57 according to the comparison result of the second phase signal and separated signal. Similarly, the separated signal comprises a plurality of continuous and periodic separated pulses which are selected from the group consisting of triangular, sinusoidal, trapezoidal, and polygonal pulses. The second phase signal can be sinusoidal pulses the same as in the first embodiment or other pulses according to desired performance. Please refer to FIG. 10, the second phase signal 64 is a triangular pulse and the separated signal is the same as in FIG. 6. The first motor speed control signal 65 is thus generated by comparator 57. A different first motor speed control signal 75 can be obtained as shown in FIG. 11 after the comparison of the second phase signal 74 and separated signal 71 by the comparator 57 if using the separated signal 71 of FIG. 7. Similarly, the second phase signal can also comprises trapezoidal or polygonal pulses. The first motor speed control signals 65 or 75 herein performs similar functions as the first motor speed control signal in the first embodiment and as such, description thereof is omitted here.

In view of the previously discussed, the invention provides a motor control method to control a coil in a motor and thus start the motor, the method comprises receiving a phase signal wherein the phase of the phase signal is consistent with the rotation phase of the coil in the motor and the phase signal is generated from a Hall element or a phase signal generating circuit. A separated signal is then generated, wherein the separated signal comprises a plurality of continuous and periodic separated pulses which are selected from the group consisting of triangular, sinusoidal, trapezoidal, and polygonal pulses. The phase signal and the separated signal are compared to generate a control signal. to generate a motor speed control signal. The coil in the motor is controlled, and thus the motor starts to rotate thereby. The motor speed control signal comprises a plurality of square pulses and within a specified phase, the width of a square pulse near the center of the phase is greater than that of a square pulse farther from the center. The method can further comprise supplying a pulse width modulating signal by a pulse width modulation generator to modulate the motor speed control signal and thus decrease the speed of the motor.

In conclusion, a motor speed control signal is supplied to a coil in the motor for reducing the noise caused when the coil changes phase during motor rotation. If the motor is a fan motor, the noise of the fan motor can thus potentially be reduced.

While the invention has been described by way of example and in terms of preferred embodiment, it is to be understood that the invention is not limited thereto. On the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A motor control circuit serving a coil in a motor for controlling the motor, the motor control circuit comprising:
    a Hall element for generating a first phase signal;
    a separated signal generating circuit for generating a separated signal;
    a comparator coupled to the Hall element and the separated signal generating circuit, for comparing the first phase signal and the separated signal to generate a first control signal;
    an amplifier circuit coupled with the Hall element and the comparator, for receiving the first phase signal and amplifying the first phase signal to the comparator; and
    a coil switching circuit coupled to the comparator receiving the first control signal to serve the coil for controlling the motor.

2. The motor control circuit of claim 1, wherein the separated signal has a plurality of continuous and periodic separated pulses selected from the group consisting of triangular, sinusoidal, trapezoidal, and polygonal pulses.

3. The motor control circuit of claim 1, wherein the first control signal is a first motor speed control signal having a plurality of square pulses, wherein within a phase, the width of a square pulse near the center of the phase is greater than that of a square pulse farther from the center of the phase.

4. The motor control circuit of claim 1, wherein the motor control circuit further comprises a driving circuit coupled with the Hall element and the coil switching circuit, for receiving the first phase signal to generate a second control signal to the coil switching circuit.

5. The motor control circuit of claim 4, wherein the second control signal has a function control signal selected from the group consisting of lock, test and restart signals, and has a second motor speed control signal.

6. The motor control circuit of claim 1, wherein the motor control circuit further comprises a pulse width modulation (PWM) generator coupled to the coil switching circuit to modulate the coil switching circuit for changing the motor speed.

7. The motor control circuit of claim 1, wherein the motor is a fan motor.

8. A motor control circuit serving a coil in a motor for controlling the motor, the motor control circuit comprising:
    a phase signal generating circuit generating a first phase signal wherein the phase of the first phase signal is consistent with a rotation phase of the coil in the motor;
    a separated signal generating circuit generating a separated signal;
    a comparator coupled with the phase signal generating circuit and the separated signal generating circuit, for comparing the first phase signal and the separated signal to generate a first control signal;
    an amplifier circuit coupled with the phase signal generating circuit and the comparator, for receiving the first phase signal and amplifying the first phase signal to the comparator; and
    a coil switching circuit coupled with the comparator and a driving circuit, receiving the first control signal to serve the coil for controlling the motor.

9. The motor control circuit of claim 8, wherein the separated signal has a plurality of continuous and periodic separated pulses selected from the group consisting of triangular, sinusoidal, trapezoidal, and polygonal pulses.

10. The motor control circuit of claim 8, wherein the first phase signal is selected from the group consisting of triangular, sinusoidal, trapezoidal, and polygonal pulses.

11. The motor control circuit of claim 8, wherein the first control signal is a first motor speed control signal having a plurality of square pulses wherein, within a phase, the width of a square pulse near the center of the phase is greater than that of a square pulse farther from the center of the phase.

12. The motor control circuit of claim 8, wherein the motor control circuit further comprises:
a Hall element generating a second phase signal having the same phase as the phase of the first phase signal; and
a driving circuit coupled to the Hall element, for receiving the second phase signal to generate a second control signal to the coil switching circuit, wherein the coil switching circuit is capable of either receiving the first or second control signals to serve the coil for controlling the motor.

13. The motor control circuit of claim 12, wherein the second control signal has a function control signal selected from the group consisting of lock, test and restart signals and a second motor speed control signal.

14. The motor control circuit of claim 8, wherein the motor control circuit further comprises a pulse width modulation (PWM) generator coupled to the coil switching circuit to modulate the coil switching circuit for changing the motor speed.

15. The motor control circuit of claim 8, wherein the motor is a fan motor.

16. A motor control method serving a coil for controlling the motor, wherein the motor control method comprises the steps of:
receiving a phase signal consistent with the rotation phase of the coil in the motor;
generating a separated signal;
comparing the phase signal and the separated signal to generate a control signal;
serving the coil for controlling the motor through a coil switching circuit by the control signal; and
supplying a pulse width modulating signal to the coil switching circuit, wherein the pulse width modulating signal is the modulated version of the control signal for decreasing the motor speed.

17. The motor control method of claim 16, wherein the separated signal has a plurality of continuous and periodic separated pulses selected from the group consisting of triangular, sinusoidal, trapezoidal, and polygonal pulses.

18. The motor control method of claim 16, wherein the control signal is a motor speed control signal having a plurality of square pulses wherein, within a phase, the width of a square pulse near the center of the phase is greater than that of a square pulse farther from the center of the phase.

19. The motor control method of claim 16, wherein the motor is a fan motor.

* * * * *